United States Patent
Rainer (10) Patent No.: US 12,243,425 B2
(45) Date of Patent: Mar. 4, 2025

(54) METHOD FOR COMMUNICATION BETWEEN ROAD USERS, AND COMMUNICATION SYSTEM

(71) Applicant: AUDI AG, Ingolstadt (DE)

(72) Inventor: Julia Rainer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 77 days.

(21) Appl. No.: 18/042,160

(22) PCT Filed: Jul. 30, 2021

(86) PCT No.: PCT/EP2021/071366
§ 371 (c)(1),
(2) Date: Feb. 17, 2023

(87) PCT Pub. No.: WO2022/037923
PCT Pub. Date: Feb. 24, 2022

(65) Prior Publication Data
US 2023/0316918 A1  Oct. 5, 2023

(30) Foreign Application Priority Data
Aug. 19, 2020 (DE) ...................... 10 2020 121 754.4

(51) Int. Cl.
G08G 1/16 (2006.01)
H04W 4/08 (2009.01)
H04W 4/40 (2018.01)

(52) U.S. Cl.
CPC .............. *G08G 1/161* (2013.01); *H04W 4/08* (2013.01); *H04W 4/40* (2018.02)

(58) Field of Classification Search
CPC ........... G08G 1/161; H04W 4/46; H04W 4/08
See application file for complete search history.

(56) References Cited

U.S. PATENT DOCUMENTS

| 8,352,111 B2 | 1/2013 | Mudalige |
| 9,565,705 B2 | 2/2017 | Noh et al. |

(Continued)

FOREIGN PATENT DOCUMENTS

| DE | 102010056438 A1 | 6/2012 |
| DE | 102018216082 A1 | 12/2018 |

(Continued)

OTHER PUBLICATIONS

International Preliminary Report on Patentability directed to related International Patent Application No. PCT/EP2021/071366, issued Feb. 16, 2023, with attached English-language translation; 18 pages.

(Continued)

*Primary Examiner* — Benyam Haile
(74) *Attorney, Agent, or Firm* — Sterne, Kessler, Goldstein & Fox P.L.L.C.

(57) ABSTRACT

The present disclosure relates to a method for communication between road users, including at least one motor vehicle, in a traffic situation, wherein each road user has a communication device that uses a communication channel to periodically transmit basic information comprising at least one operating parameter and a position of the road user, wherein, to form a communication group for an application, in particular a movement maneuver, a road user that is planning to perform the application transmits a request message via the communication channel, wherein a response message from at least one further road user that is likewise planning or performing the application results in the communication group being established with said further road user, wherein at least one group member of the communication group periodically transmits a group status message via the communication channel as communication leader representing all group members, said group member status message using identification information to describe the (Continued)

group members as a joint object, performing the application, in such a way that an additional message sent to the object with the identification information is received and evaluated by all group members.

15 Claims, 2 Drawing Sheets

(56) References Cited

U.S. PATENT DOCUMENTS

| | | |
|---|---|---|
| 11,247,674 B2 | 2/2022 | Dolgov et al. |
| 2020/0163005 A1* | 5/2020 | Rao .................. H04W 4/40 |
| 2022/0063622 A1* | 3/2022 | Jumpertz ............ B60W 30/165 |
| 2022/0415181 A1* | 12/2022 | Wang ............... G08G 1/096775 |

FOREIGN PATENT DOCUMENTS

| | | | | |
|---|---|---|---|---|
| DE | 102018203797 A1 * | 9/2019 | ............... | G08G 1/22 |
| EP | 3528078 A1 | 8/2019 | | |
| EP | 3651533 A1 | 5/2020 | | |
| WO | WO 2020/033086 A1 | 2/2020 | | |

OTHER PUBLICATIONS

International Search Report of the International Searching Authority directed to related International Patent Application No. PCT/EP2021/071366, mailed Nov. 15, 2021, with attached English-language translation; 5 pages.

* cited by examiner

METHOD FOR COMMUNICATION BETWEEN ROAD USERS, AND COMMUNICATION SYSTEM

TECHNICAL FIELD

The present disclosure relates to a method for communication between road users, including at least one motor vehicle, in a traffic situation, each road user having a communication device that uses a communication channel to periodically transmit basic information comprising at least one operating parameter and a position of the road user. In addition to this, the present disclosure relates to a communication system.

BACKGROUND

Communication technologies are becoming increasingly important in road traffic. Wireless communication concepts that are to be used in road traffic are usually summarized under the term "vehicle-to-x communication" ("vehicle-to-x", V2X). The basis of such communication systems in which many, ideally all, road users are aligned with a suitable communication device, is formed by the use of a common communication channel, by means of which the road users transmit, by means of their communication devices, at regular intervals, therefore periodically, basic information to all other road users, which may contain, in particular, the position of the transmitting road user, a possibly temporary identification, and further operating parameters of the transmitting road user, so that ultimately an image of the road traffic in the surroundings of a receiving road user that is ideally as complete as possible is produced for said road user. In the prior art, concepts for such basic information have already been proposed, for example the use of so-called basic safety messages (BSM), cooperative awareness messages (CAM) and/or decentralized environmental notification messages (DENM). The communication channel is usually implemented via a WLAN or a mobile radio network.

In addition to the option of coordinating driving maneuvers of different road users, the goals of V2X technologies are, in particular, also increasing traffic safety and traffic flow, in particular also to encourage a reduction in the accident rate. However, the amount of communication information which can be transmitted via a communication channel, i.e., a V2X air interface, is limited by the bandwidth and the frequency, wherein for this purpose also any quality restrictions that may be present and are measurable, for example via the BLER (block error rate) or the PER (packet error ratio), are to be taken into account. Using the mode of operation of conventional V2X technologies, the periodic basic information is transmitted by the correspondingly equipped road users via this limited bandwidth, for example every 10 ms, as a result of which a large quantity of messages is produced. If further functions and applications are to be implemented, for example cooperative parking processes and the like, a further load on the available communication bandwidth is to be expected. In other words, there is a threat of too strong a load on the communication channel, which also increases the complexity of algorithms of the road users that have to evaluate the received communication information.

DE 10 2014 215 690 A1 proposes a device and a method for avoiding a message collision between V2V communication, in which it is proposed to adapt the data rate or a message transmission frequency depending on the current communication. Furthermore, approaches are already known in the prior art to form so-called "platoons" or columns in which vehicles or road users drive in a jointly coordinated manner for a certain time, in particular in a manner controlled by a lead vehicle. For example, EP 3 651 533 A1 describes a joint use of an emergency evasion trajectory, EP 3 528 078 A1 relates to a platoon control system for intersections, and DE 10 2018 216 082 A1 describes a method for cooperative maneuver coordination, wherein planning planes are executed in a cascading manner and, when each planning plane is executed, information exchange with adjacent vehicles is carried out for determining a collision, wherein in the case of a detected collision in at least one planning plane, a maneuver coordination between the vehicles is carried out via the communication connection. DE 10 2010 013 647 A1 relates to a vehicle column in which a leading vehicle transmits assigned vehicle positions to other vehicles.

Such V2X communication technologies are gaining in importance also with regard to the fully automatic operation (autonomous operation) of motor vehicles, because additional information can improve the overall safety there. DE 10 2010 056 438 A1 describes an approach in which platoon driving is to be made possible in closed towns or in the city, by environment sensors of a motor vehicle recording appropriately suitable information.

Nevertheless, most functions or applications for coordinating the operation of road users use communication approaches that require more than just simple broadcast messages, for example the basic information. For example, specific further communication information is exchanged in platooning approaches. After the number of applications increases steadily, there is the risk of overloading the existing bandwidth for V2X messages. Nevertheless, there are also further problems in this regard. Thus, for example, possibilities for coordinated operation of a plurality of road users on the one hand are limited to a same road user class, for example motor vehicles, so that other, in particular vulnerable, road users, for example pedestrians or cyclists, can be excluded and cannot benefit from the advantages. Another problem is that, for various reasons, not every road user can or wishes to participate in such a platoon. With regard to certain applications, less safety can then be provided for such road users, but at the same time an increased communication activity can be provided, because they have to communicate their future planning and intention individually.

DETAILED DESCRIPTION

The present disclosure is therefore based on the object of specifying a simplification of the V2X communication which reduces in particular the number of messages required through a communication channel and a general increase in safety for road users, in particular those which cannot participate in a platoon.

To achieve this object, in a method of the type mentioned at the outset it is provided according to the present disclosure that to form a communication group for an application, in particular a movement maneuver, a road user that is planning to execute the application transmits a request message via the communication channel, a response message from at least one further road user that is likewise planning and/or executing the application resulting in the communication group being established with said further road user, at least one group member of the communication group periodically transmitting a group status message via the communication channel as the communication leader representing all group members, said group status message using identification information to describe the group members as a joint object executing the application in such a way that an additional message sent to the object with the identification information is received and evaluated by all group members.

Especially advantageously, the group status message may comprise coverage information describing the extension of the object as a geometric shape covering all group members.

The present disclosure therefore proposes the formation of groups for simplifying V2X communication and ideally also for increasing safety for participating group members, which groups are spontaneous, exist only briefly or are rapidly changeable in their composition. Therefore, temporary communication groups of group members are formed who want to execute a specific application, in particular therefore a certain movement maneuver, wherein the communication group and the information following therefrom are particularly preferably completely independent of any coordinating measures for the application, in particular neither demanding nor requiring such. The communication group receives unambiguous identification information, so that, for example, communication information which is directed to all the road users who want to execute the application must be transmitted only once to the communication group, wherein in particular the identification information can be selected such that only the group members of this communication group can decrypt a corresponding communication message directed to the communication group. Such V2X communication technologies have already been proposed in the prior art, reference being made purely by way of example to the 3GPP standard. On the other hand, all the road users executing the application do not—as was previously necessary—have to transmit their own messages that they are executing this application, because it is entirely sufficient if this is done by the communication leader, wherein it is particularly advantageous here to specify a coverage of the object formed by the group members, so that each group member can therefore be perceived and taken into account accordingly. In this way, the number of communication information messages to be transmitted via the communication channel is reduced, which channel can correspond, for example, to the 5G Standard.

The communication leader is not to be understood as a lead vehicle or the like since the communication group is used only as an object in the communication system that is addressable and defined via the group status message. In this way, without further obligations of the group members, an advantage is achieved both with regard to the utilization of the communication channel and with regard to safety, because, in particular, shorter range communication devices and the associated road users are also represented by the group status message and, when the coverage information is used, they can ultimately move along in the "shadow," so to speak, of other road users.

Another advantage of the formation of temporary communication groups within the scope of the present disclosure is that different types of road users can join the communication group, which is not possible, for example, in platoons with a targeted use case. In addition, the method according to the some embodiments contributes to improving the flow of traffic. This is because it has been recognized that in many traffic environments or traffic situations, the same movement maneuvers are often carried out by road users one after the other, wherein an overall object for such road users can be formed for the communication via the communication group, which significantly simplifies the communication in this regard and thus also the consideration of road users executing the application. By way of example, the communication group in the group status message can then be represented as a 3 m wide and 15 m long object, wherein, for example, two cyclists, a motor vehicle and a motorcycle, which have the same intention—and thus, for example, are planning the same movement maneuver or are already occupied with the execution thereof—can be located as group members within said object via the coverage information, which, of course, can also describe an object shape, therefore a group shape.

It is particularly advantageous if the communication leader is determined on the basis of a selection criterion that evaluates, in particular exclusively, at least a portion of the basic information without further message exchange. It can be specifically provided, for example, that a group member, in particular a motor vehicle, which provides the greatest computing power for the communication function and/or has the greatest mass and/or coverage and/or is fully automatically guided and/or has the largest communication range, is selected as the communication leader. In other words, a road user, in particular a motor vehicle, which is better equipped than other group members with respect to the communication device and/or otherwise, can in particular be used as the communication leader, which is described accordingly by the selection criterion. Particularly advantageously, the communication leader is selected as the one with the strongest antenna and/or the best transmission power and/or the highest transmission rate and/or the highest transmission accuracy, since other group members can then benefit from these improved communication properties. This applies in particular to so-called vulnerable road users (VRU), who usually use mobile devices, for example, as communication devices, or that comprise the communication device. A mobile device of this type may, for example, be a mobile phone, in particular a smartphone. Such mobile devices or communication devices formed thereby usually have a lower transmission range and/or transmission accuracy. By virtue of the fact that such group members are represented by the communication leader with the significantly improved equipment, in particular in the case of a higher transmission range of the communication leader, such "weaker" group members can also use this equipment, so that, for example, a somewhat more distant road user which has not yet been able to obtain communication information of a group member, for example of a pedestrian or cyclist, is already made aware of the presence of said group member on the basis of the group status message, in particular when said message contains the coverage information, which results in greater safety for such group members. In this sense, for example, a VRU moves, so to speak, "in the shadow" of a better equipped and/or larger road user and is implicitly protected thereby.

While it is preferred according to the present disclosure if each group member individually concludes, using the basic information which is present in each communication device, who the communication leader is based on the selection criteria, embodiments are also conceivable in which the selection of the communication leader is confirmed by the other group members, in particular by means of a confirmation message over the communication channel. For example, in the context of the first group status message and/or as a targeted communication leader message, the communication leader can, as it were, request to be the communication leader on the basis of the at least one selection criterion, which the other group members quickly confirm. If another group member is not in agreement, for example, it can also leave the communication group again.

In a particularly advantageous embodiment, a control device of the communication leader belonging to the communication device and/or assigned thereto can determine, from the basic information of the group members, at least a portion of the content of the group status message, in particular the coverage information, in particular with respect to the communication exclusively. In other words, within the scope of the present disclosure, the basic information, which is still regularly transmitted by the different group members, is preferably completely sufficient to all contents of the group status information, which describe the communication group beyond the identification information and the application, derivable for the communication leader (and, of course, also other group members, where applicable) from the basic information. Therefore, the communication leader can, as it were, in particular monitor the current positions or movements of the group members in order to continuously provide current coverage information describing the position and geometric shape of the formed object, in particular also including an object shape/group shape. Therefore, no further messages are required via the communication channel with respect to the group status message and the determination thereof. However, it can be expedient here if sensor data of at least one environment sensor of the communication leader are used in particular for plausibility checking and/or refinement. In other words, the communication leader passively monitors what the group members do and, in particular, adjusts the group status message accordingly. As will be explained in more detail, the communication group is preferably not controlled or led by the communication leader in any respect, in particular with regard to the application, meaning that each group member can continue to decide individually at any time how it will act, whether it be automatically and/or through a correspondingly included person.

However, since it can happen that a group member, without explicitly leaving the communication group, decides not to execute the application, in particular the movement maneuver, an expedient design of the present disclosure can provide that the control device is further designed to compare the basic information of the group members to the application, wherein, when a comparison result for a group member indicates a non-execution of the application, said group member is removed from the communication group. In other words, the communication leader can also serve as a type of monitoring entity. The removal of a group member in this way can be announced by a corresponding removal message at least to the other group members.

In general, however, it can also be provided that at least one group member, in particular after the execution of the application, leaves the communication group by means of a leaving message, and/or at least one road user of the communication group joins by means of a response message on the basis of the group status message. This means that the group may have a varying composition over time, in particular in the case of occupied locations, for example a much traveled intersection, if first group members have already completed the application, in particular a movement maneuver, and therefore exit from the communication group, or other road users who still want to execute the application are added, since they can detect the existence of the communication group on the basis of the group status message and can transmit a corresponding response message. Expediently, with each change in the group composition, the at least one selection criterion can be evaluated anew, in particular when the communication leader itself exits. In this way, for example, the road user which currently has the largest transmission range or the like can always be selected as the communication leader.

However, it should be pointed out overall that in many traffic situations, it is possible that communication groups exist only very briefly, since, for example, road users who are located in a specific environment, for example an intersection, do not always exist who want to turn left, want to drive straight ahead and/or want to execute other movement maneuvers. However, this short-term situation represents a core of the inventive idea, according to which, without great communication effort, temporary local communication groups can flexibly be formed for applications and bring about a significant relief of the communication channel and an equally significant increase in safety for the group members.

As already mentioned, it is particularly advantageous in the context of the present disclosure that each group member controls the execution of the application independently of the other group members, in particular without group-internal communication. This means that the formation and provision of the communication group is a self-contained overall function which exists independently of other functions, in particular also with regard to the application. In terms of the application, it does not generate any obligations or specifications for the group members, and thus in particular does not represent a basis for a platoon or an otherwise coordinated execution of the application, but can in some cases be used to agree on the use of a separate functionality, for example by corresponding requests to the communication group as an object.

It should also be noted, in particular, that a group-internal communication in the communication group is not necessary, even with respect to the group status message, because, as explained above, this status message can ideally be derived from the basic information. In other words, the communication leader, for example, can track, on the basis of the basic information and the knowledge of which road users are group members, how they move or implement the application.

Nevertheless, the group status message can of course expediently be used in a separate cooperative functionality relating to a plurality of road users. For example, vehicles which are turning as a column can, in the planning of their trajectory, take into account vehicles crossing straight ahead on the basis of the communication group and their group status message, etc., as is of course also true for individual road users.

Within the scope of the present disclosure, it is also entirely conceivable that, in an additional function that is separate from the formation and use of the communication group, in particular using a separate communication channel, a coordinated execution of the application takes place for at least a portion of the group members. For example, a request for implementing such a coordination function can be made to the communication group as an object and then be made in a coordination group separately for the group members who have joined the coordination group.

In summary, it can therefore be said that a communication group can be established on the basis of the basic information which is transmitted periodically by the road users, without requiring additional communication information from the group members and without having to execute longer communication steps. By way of example, the formation of a communication group can take place when a road user, in particular a motor vehicle, with a well-designed communication device, in particular of a high transmission range and transmission quality, wants to execute an application, and essentially proposes for other networked road users surrounding them to "drive along." In particular, road users having weaker communication equipment and/or vulnerable road users (VRUs) can hereby obtain advantages of increased safety, and the necessary communication over the communication channel can be reduced. In this case, road users are grouped in particular without further functions thus having to be executed. The communication group is not controlled or led in any respect by a motor vehicle/infrastructure element, for example a traffic light, and the distance between road users, the speed and the like are not affected by this pure communication function, but can be freely selected by each group member individually.

At the beginning of the method, as already explained, a request message is transmitted from a road user planning the application via the communication channel. The request message describes at least the application, but ideally also contains additional information, for example a location to which the request relates (e.g., an intersection or the like), a speed, a trajectory, a start time and/or other request information which is useful when deciding whether to join a group.

In this context, a particularly advantageous embodiment provides that the request message is transmitted when a request criterion is met, wherein the request criterion in particular checks whether the number of road users within a predetermined radius around the road user and determined on the basis of received basic information exceeds a threshold value. Thus, while a prerequisite for the request message is self-evidently to plan the execution of the application oneself, it is also possible to check further request criteria. Such request criteria can relate, for example, to the road user that is individually planning the request, so that, for example, only road users send request messages which either already have a well-equipped communication device, in particular with regard to the transmission range, and/or a sufficient size, in order thus ultimately to provide the request message as an offer with respect to increasing safety/range. Of course, it is also possible for "weaker" road users, for example VRUs, to post request messages in a targeted manner in order to obtain assistance, so to speak. This can, for example, also be initiated manually by a person as a road user, for example a pedestrian or a cyclist, by means of an application on a mobile device providing the communication device, for example by means of an app. It should also be pointed out that generally the method according to the present disclosure, in particular the establishment and use of the communication group, is of course carried out automatically, in particular by the corresponding communication devices or the control devices thereof.

Another type of request criteria can also relate to the traffic situation per se, and in particular can be designed to check whether there is any sufficiently great probability at all for the formation of a communication group. For this purpose, for example, received basic information can be evaluated, wherein, for example, the traffic density can be considered and compared to a threshold value. In other words, the road users planning the application, in particular a certain movement maneuver, can determine whether or not many road users are located in the vicinity based on the density of the basic information. If the at least one request criterion is met, the request message is transmitted to all road users.

Road users who receive this request message via their communication device and are likewise planning the application—and where applicable may also determine a confirmation subject to evaluation of further request information—can now decide whether or not they want to join the communication group. This decision, if it is "Join," is announced by a corresponding response message, so that the communication group is established.

Next, the communication leader, as described, is determined, and the communication group appears as an object. Thus, while the group members ultimately execute the application jointly, in particular the movement maneuver, only the communication device of one of the group members, namely the communication leader, additionally transmits the group status message periodically while, in particular, all group members continue to transmit their basic information periodically, therefore occurring as their own objects. The communication leader can naturally evaluate the corresponding basic information, since it knows who is a group member, for example in order to determine the coverage information. After successful execution of the application, the communication group can be separated accordingly and the road users can go their own ways.

It should be noted at this point with respect to vulnerable road users, i.e., the VRUs, that the membership in the communication group ultimately also has the effect of increasing safety in that its individual occurrence (periodic transmission of the basic information) is ultimately reinforced by the regular group status message.

The application can be selected, for example, from the group comprising: a driving through of a roundabout to a certain exit, a straight ahead travel at an intersection, a left turn, a right turn, a lane change to the left, a lane change to the right, a departure from a fast road, an entry onto a fast road, and the crossing of the road. Furthermore, a plurality of further applications, in particular movement maneuvers, are of course still possible. Applications to which the present method can be applied can be suitably codified for communication devices, for example, and can be present in a database such that they can be queried. Thus, for example, an application number can be assigned to each application, so that, for example, a request message can ask whether other road users also want to execute the application number 25 (for example, straight-ahead driving through an intersection). As already mentioned, the request message expediently contains further request information which makes it easier for the other road users to decide for or against joining a group, for example a trajectory planned by the requesting road user, speed, the location to which the request relates, the start time and the like.

While any communication channels or communication networks can ultimately be used within the scope of the present disclosure, the 3GPP standard can particularly preferably be used. The basic information can be a BSM and/or a CAM, as already described above, and/or the basic information can be transmitted every 5 to 20 ms, for example every 10 ms. A 5G communication network, for example, can be used as the communication network in which the communication channel is created.

Finally, it should be mentioned again that it is ultimately substantially and particularly advantageous for the present disclosure that no infrastructure element or superordinate vehicle exerts authority over the communication group, as a lead vehicle would in the case of a platoon. Because the communication group serves as a joint identification and not the assumption of responsibility, the individual group members individually decide and determine their movement parameters, for example speed intervals and the like. There is no responsibility given to the road user sending the request message or to the road user serving as communication leader.

A first conceivable example would be a traffic situation in which a jogger, a plurality of cyclists and a driver of an e-scooter want to cross a road together. In this first example, a communication device of the e-scooter queries the networked road users in the vicinity as to whether they also want to travel straight ahead at the next intersection without a traffic light control at a certain time. A jogger and a plurality of cyclists respond positively to this request message with a response message. They agree, forming a communication group, and the e-scooter, more precisely its communication device, assumes responsibility for sending the group status message. The group members then all execute the movement maneuver; after completion the communication group dissolves again on its own and the jogger continues to run straight ahead, for example, while one of the cyclists turns left at the next intersection, etc.

In a second example, a bus, a passenger car and a motorcycle rider turn together to the left. In this case, the bus transmits the request message to the surrounding road users as to whether they want to turn to the left at the next intersection at a certain time. A passenger car and a motorcycle respond positively to this request message with a response message. They form a communication group and the communication device of the motorcycle rider assumes the periodic transmission of the group status message. After all road users have ended the "turn left" application, the communication group is dissolved.

If now, for example, in the first exemplary embodiment, a motor vehicle intends to turn to the right where the jogger, the cyclist and the e-scooter are crossing the road, it receives from the group status message in particular also the coverage information, which communicates to it the extension of the communication group as an object, so that the motor vehicle can correspondingly take account of this extension. However, the motor vehicle also has the possibility of addressing the communication group and, for example, indicating that it is approaching from the rear and wishes to turn there, so that, for example, in the case of the individual group members which can receive and decrypt this communication information, a warning can be output or the like. In particular, it is also possible in this example to reach the jogger and the cyclist, even if their transmission range is fundamentally limited, because the e-scooter has a larger transmission range and has made the other group members known beyond their transmission range, so to speak.

In addition to the method, the present disclosure also relates to a communication system comprising communication devices of a plurality of road users, which are designed to carry out the method according to the present disclosure. In other words, at least one communication device is designed to transmit the request message via the communication channel, a plurality of, in particular all, communication devices (or their control devices) are designed for evaluating the request message and for transmitting a response message when planning to join the communication group, and at least one of the communication devices is also designed to take over the role of the communication leader. All embodiments relating to the method according to the present disclosure may be applied to the communication system according to the present disclosure, with which the aforementioned advantages may therefore also be obtained.

Figure 1:
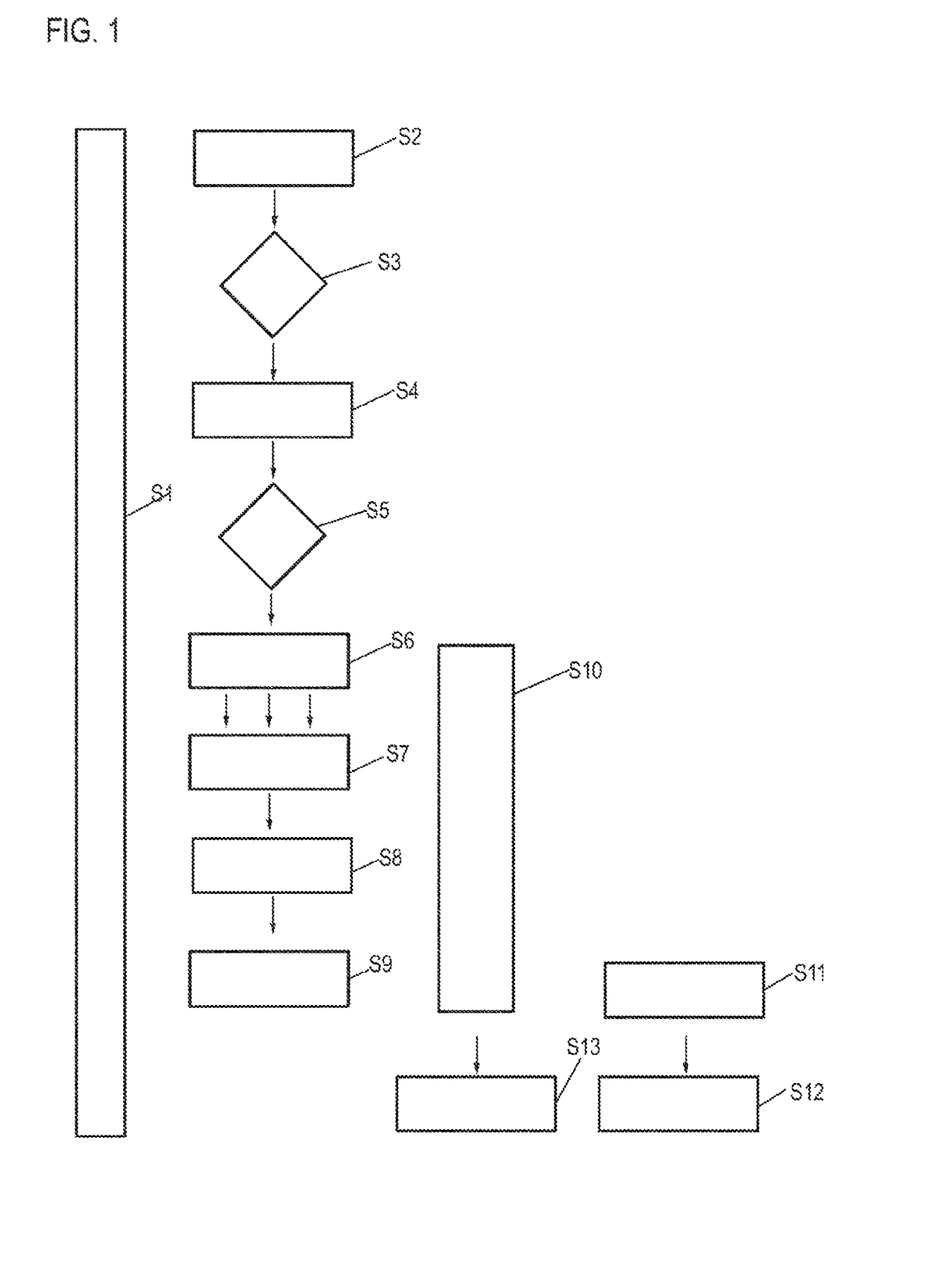
FIG. 1 is a flow chart illustrating an embodiment of the method for communicating between road users.

FIG. 1 is a flow chart of an embodiment of the method according to the present disclosure. The method takes place in the context of a motor vehicle-to-X communication (V2X communication), in which the communication devices of different road users use a common communication channel, for example in a 5G communication network, in order to exchange communication information. In this case, each road user, more precisely the communication device of each road user, periodically transmits basic information according to the ongoing step S1, for example as or comprising a BSM and/or a CAM. The basic information contains at least one, in particular temporary, identifier/identification information of the road user and its current position, but usually also various further operating parameters, for example its speed. Operating parameters may, of course, also describe properties of the road user, for example its type, equipment, and the like, as well as intended actions.

In a step S2, it is now determined in one of the road users that the execution of an application, in this case a movement maneuver, is planned. Such an application may be, for example, a lane change process, a turning operation, a crossing operation, an entry or exit operation in the case of a fast road and the like. In a step S3, a request criterion is then checked, in the present case as to whether a sufficiently large amount of basic information has been received from a predefined radius around the road user that the traffic density exceeds a threshold value. If this is not the case, the road user simply continues to execute the application. However, if the at least one request criterion is fulfilled in step S3, a request message is transmitted in step S4 via the communication channel. In addition to the identification information of the requesting road user, the request message comprises application information which describes the movement maneuver, for example an identifier of the application according to a database, and further request information, in particular the location to which the application refers (for example "the next intersection") and, if applicable, also a starting time at which the application is expected to take place. Further request information is also conceivable in a request message, for example a current speed of the requesting road user, the planned trajectory and the like.

In a step S5, the road users receiving the request message check whether they want to join a communication group with regard to the application. This is usually always the case when the road users likewise want to execute the application, in this case the movement maneuver, within a relevant period at the corresponding location. This can be illustrated, for example, via a joining criterion.

If the at least one joining criterion is met, which can be evaluated, for example, in the respective communication devices or an associated/contained control device, a response message is sent in a step S6 by those road users who want to join the communication group, in this case a plurality of road users (specifically their communication devices), as shown by the plurality of arrows at step S7, in which the communication group is established with the requesting road user and the road users transmitting a response message. To this end, mechanisms of the underlying communication protocol are used, for example according to the 3GPP Standard, according to which communication groups can be established, so that communication information directed to said communication groups can be decrypted and thus evaluated only by the group members thereof. Of course, other mechanisms are also conceivable. In this case, it should already be noted at this point that in preferred exemplary embodiments a further group-internal communication is no longer provided, apart from leaving messages and/or group dissolving messages, so that the establishment of the communication group and the use thereof scarcely occupy communication bandwidth.

In a step S8, the basic information of all group members is evaluated by each group member in order to determine on the basis of selection criteria which member is to be the communication leader of the communication group. Using the same selection criteria, each group member should come to the same result, so that further communication in this regard is basically unnecessary. However, exemplary embodiments can provide that the group member which is determined as a communication leader would announce this via a confirmation request, whereupon the other group members can confirm this or, if this is not desired, exit.

The at least one selection criterion is aimed in particular at selecting as a communication leader the road user that is best equipped with respect to the communication device. In this selection process, in particular the transmission range, but also the transmission quality, can be given great weight.

According to step S9, the communication leader then starts to periodically transmit group status messages, which, in addition to identification information, via which the group can be addressed as a separate object in the communication, also describes the application in the present case and contains coverage information relating to the communication group, meaning it indicates a geometric region in which all members of the communication group are contained. In simple cases, this can be rectangularly defined as a rectangle enclosing all group members, but it is preferred if an object shape or group shape can also be specified. The coverage information and, where applicable, further status information of the communication group which is to be sent in the group status message is determined by the communication leader—specifically the communication device thereof or a control device assigned to the communication device—with respect to the V2X communication exclusively from the basic information, which is sufficient for this purpose since it also at least implicitly describes a coverage of the individual road user in addition to a current position of the respective road user, for example in order to be able to perform a collision check in general.

It should also be noted here that the communication leader (or another group member) may also monitor the behavior of the other group members at any time based on the basic information and, in particular, may check for plausibility with regard to the execution of the application. Thus, a comparison of the movement of the group members described by the basic information with the application can take place, wherein if the comparison result indicates that the application is not executed, a group member may also be excluded from the communication group.

In all of these evaluations, there is preferably no further group-internal communication in the communication group since the basic information is sufficient for this purpose. If necessary, this basic information may also be supplemented with sensor data from environment sensors of the communication leader.

During all of these steps, the group members, as indicated by step S10, execute their respective desired movements, in particular also the application, completely independently of the existence of the communication group. This means that the communication group does not carry out any coordination, nor any designation of any of the group members as a leading entity providing specifications. An infrastructure device which would execute such a thing is also not included in the communication group. In other words, the membership in the communication group has no influence on the guidance or control of the respective road user or its movement. The formation and use of the communication group is therefore a pure communication function which is not used for coordination, in particular in the sense of a platoon.

However, the existence of the communication group may be used to form, for example, a platoon, according to which corresponding requests may be sent to the communication group, and group members can also agree to participate in a platoon in a separate functionality. In general, however, the formation and use of the communication group also enables other road users to address all group members with only a single message, for example to transmit collision information in the event that a route of another road user collides with the application, etc. In other words, each of the group members does not have to announce individually that it is executing the application, and each of the group members does not have to be addressed individually with respect to this application by other road users; instead, one message on the part of the communication group, the group status message, is sufficient in each case.

This is schematically indicated in more detail by steps S11 and S12, according to which, in particular, a road user outside the communication group transmits communication information using the identification information of the communication group to the communication group using the communication channel, which information may be decrypted, thus understood and evaluated, by all group members in step S12.

If all group members have executed the application, the group can be dissolved again in a step S13.

Figure 2:
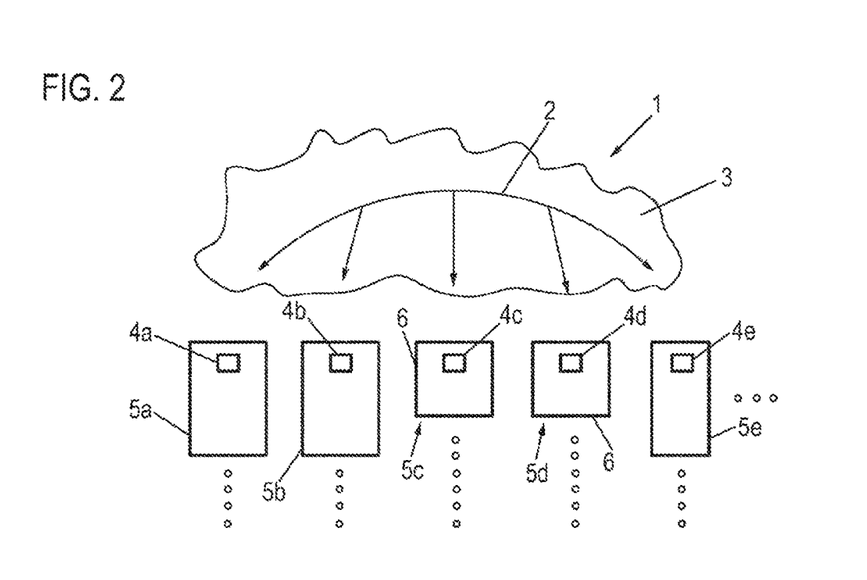
FIG. 2 illustrates a schematic representation of a communication system, according to an embodiment.

FIG. 2 schematically illustrates a communication system 1 according to the present disclosure which uses a communication channel 2 (only hinted at here) in a communication network 3, for example a 5G communication network. The communication system 1 comprises communication devices 4a, 4b, 4c, 4d, 4e which are assigned to respective road users 5a, 5b, 5c, 5d and 5e (indicated only schematically). By way of example, the road users 5a are motor vehicles of a first type, for example passenger cars, and the road users 5b are motor vehicles of a second type, for example buses and trucks. Motor vehicles usually have communication devices 4a, 4b that are well equipped with respect to transmission range and transmission quality. The communication devices 4c, 4d are implemented as parts of mobile devices 6, for example smartphones, which are carried by the road users 5c, for example pedestrians, and by the road users 5d, for example cyclists. Such road users 5c, 5d are included among the so-called vulnerable road users (VRUs). As another example, the road users 5e relate to motorized two-wheeled vehicles, for example motorcycles and scooters. Further road users are of course also conceivable in principle. Also the number of road users 5a, 5b, 5c, 5d and 5e is not limited, as is indicated by the respective points indicating continuation. The communication devices 4a, 4b, 4c, 4d and 4e are designed to carry out the method according to the present disclosure, wherein at least one of these communication devices 4a, 4b, 4c, 4d, 4e is designed with respect to the request and also at least one of the communication devices 4a, 4b, 4c, 4d, 4e is designed with respect to the communication management. However, all communication devices 4a, 4b, 4c, 4d and 4e can receive and evaluate request messages and, where appropriate, transmit response messages.

Figure 3:
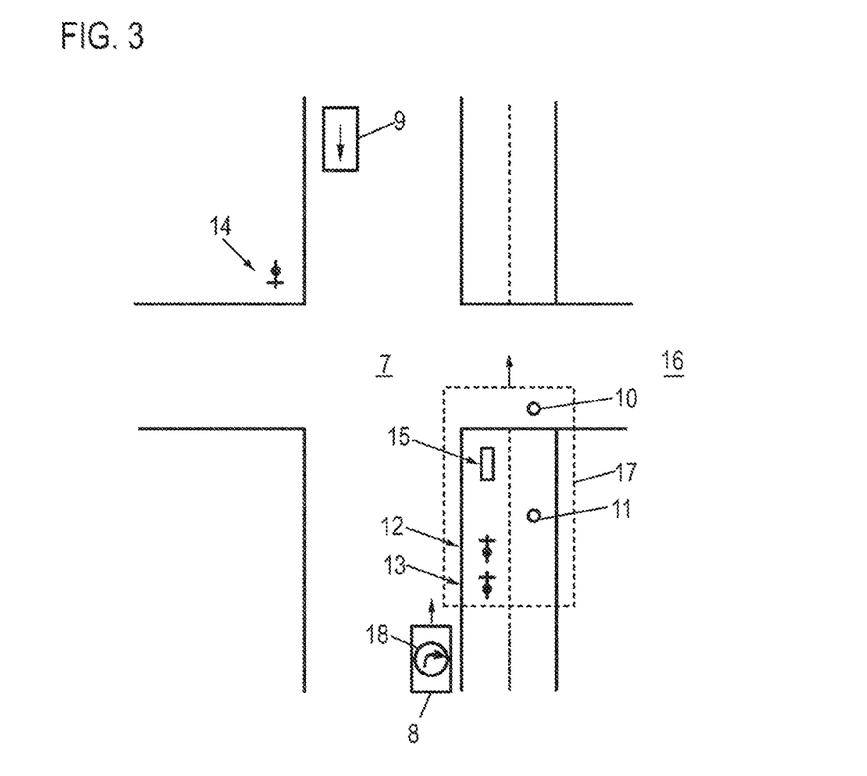
FIG. 3 illustrates a schematic representation of an example of a traffic situation.

FIG. 3 shows an example of a traffic situation at an intersection 7. In the present case, two motor vehicles 8, 9, two pedestrians 10, 11, three cyclists 12, 13, 14 and a scooter 15 are shown as road users 5a, 5b, 5c, 5d, 5e. In the present case, the scooter 15 is the communication leader of a communication group in which the pedestrians 10, 11 and the cyclists 12, 13 are additionally contained, according to which they all want to cross the road 16 moving straight ahead (application=movement maneuver). The corresponding group status information also contains coverage information, which is indicated by means of the dashed-line box 17. In the present case, the evaluation information can describe, for example, a rectangle of the length 15 m and the width 3 m, which rectangle contains all of the road users 10, 11, 12, 13 and 15.

The group status message is then received by the further road users 8, 9 and 14, wherein the road users 9 and 14 are following routes which do not interact with the application. However, as indicated by the symbol 18, the motor vehicle 8 intends to turn right onto the road 16 and can therefore take into account the group status message accordingly, in particular also the coverage information. It can also address the communication group by means of the identification information, for example in order to alert the communication group of his intention. In particular, it should be emphasized here that the motor vehicle 8 is outside the communication range of the pedestrians 10, 11 but nevertheless takes account of them because the transmission range of the scooter 15 is large enough.

The invention claimed is:

1. A method, comprising:
    transmitting, by a road user, a request message via a communication channel, wherein the road user is planning to execute a road maneuver;
    receiving a response message transmitted by at least one further road user that is planning or executing the road maneuver;
    establishing a communication group for the road maneuver based on the received response message, the communication group being a short-term communication group, wherein:
        the communication group comprises the road user that transmitted the request message and the at least one further road user that transmitted the response message,
        at least one group member of the communication group is a motor vehicle,
        each group member of the communication group has a respective communication device configured to periodically transmit respective basic information via the communication channel,
        the respective basic information comprises at least one operating parameter and a position of a respective group member,
        the communication group has a communication leader that represents all group members and periodically transmits, via the communication channel, a group status message describing all group members, the group status message having a group identification information, and
        additional messages transmitted, by a road user outside the communication group and using the identification information, are received and evaluated by all group members; and
    dissolving the communication group after all group members execute the road maneuver.

2. The method of claim 1,
    wherein the communication leader is determined based on a selection criterion, and
    wherein the selection criterion exclusively evaluates at least a portion of the respective basic information without further message exchange.

3. The method of claim 2, wherein the communication leader is at least one of the following:
    a group member that provides a greatest computing power for a communication function;
    a group member that has a greatest mass or coverage;
    a group member that is fully automatically guided; or
    a group member that has a largest communication range.

4. The method of claim 2, wherein the determination of the communication leader is confirmed by other group members using a confirmation message via the communication channel.

5. The method of claim 1, wherein the group status message comprises a coverage information describing a geometric shape covering all group members.

6. The method of claim 1,
    wherein the communication leader has a control device that belongs to the respective communication device or is assigned thereto,
    wherein the control device determines at least a portion of the group status message including a coverage information, and
    wherein the coverage information is collected from the respective basic information of all group members.

7. The method of claim 6, further comprising:
    comparing, by the control device, the respective basic information of all group members to the road maneuver; and
    in response to a comparison result for a group member indicating non-execution of the road maneuver, removing the group member from the communication group.

8. The method of claim 1,
    wherein at least one group member leaves the communication group by transmitting a leaving message, and
    wherein at least one road user joins the communication group by transmitting a response message in response to the group status message.

9. The method of claim 1, wherein each group member of the communication group controls the execution of the road maneuver independently without group-internal communication.

10. The method of claim 1, wherein at least a portion of the group members coordinately control the execution the road maneuver via a separate communication channel.

11. The method of claim 1,
    wherein the request message is transmitted when a request criterion is met,
    wherein the request criterion determines whether a number of received basic information exceeds a threshold value, and
    wherein the basic information is received from road users within a predetermined radius around a checking road user.

12. The method of claim 1, wherein the road maneuver is selected from at least one of driving through a roundabout to a certain exit, a straight ahead travel at an intersection, a left turn, a right turn, a lane change to the left, a lane change to the right, a departure from a fast road, an entry onto a fast road, and a crossing of a road.

13. The method of claim 1, wherein the basic information is transmitted as a basic safety message (BSM) or a cooperative awareness message (CAM).

14. The method of claim 1, wherein the communication group further comprises a vulnerable road user (VRU).

15. A communication system comprising communication devices of a plurality of road users, each communication device configured to:

transmit, by a road user of the plurality of road users, a request message via a communication channel, wherein the road user of the plurality of road users is planning to execute a road maneuver;

receive a response message transmitted by at least one further road user of the plurality of road users that is planning or executing the road maneuver;

establishing a communication group for the road maneuver based on the received response message, wherein:

the communication group comprises the road user of the plurality of road users that transmitted the request message and the at least one further road user of the plurality of road users that transmitted the response message, at least one group member of the communication group is a motor vehicle, each group member of the communication group has a respective communication device configured to periodically transmit respective basic information via the communication channel, the respective basic information comprises at least one operating parameter and a position of a respective group member, the communication group has a communication leader that represents all group members and periodically transmits, via the communication channel, a group status message describing all group members, the group status message having a group identification information, and additional messages transmitted, by a road user outside the communication group and using the group identification information, are received and evaluated by all group members; and dissolving the communication group after all group members execute the road maneuver.

* * * * *